United States Patent [19]

Iijima

[11] Patent Number: 4,988,217
[45] Date of Patent: Jan. 29, 1991

[54] WRAPPED BUSH

[75] Inventor: Yoshio Iijima, Nagoya, Japan

[73] Assignee: Daido Metals Company Ltd., Nagoya, Japan

[21] Appl. No.: 873,441

[22] Filed: Jun. 5, 1986

Related U.S. Application Data

[63] Continuation of Ser. No. 715,480, Mar. 25, 1985, abandoned.

[30] Foreign Application Priority Data

Mar. 27, 1984 [JP] Japan .................................. 59-58856

[51] Int. Cl.$^5$ .............................................. F16C 17/02
[52] U.S. Cl. ...................................... 384/273; 384/276
[58] Field of Search ............... 384/273, 292, 291, 276, 384/272

[56] References Cited

U.S. PATENT DOCUMENTS

| 121,804 | 12/1871 | Murfey | 384/292 |
| 509,584 | 11/1893 | Pullar | 384/292 |
| 1,200,060 | 10/1916 | Wemp | 384/292 |
| 4,514,098 | 4/1985 | Ippolito | 384/292 |

Primary Examiner—Lenard A. Footland
Attorney, Agent, or Firm—Browdy and Neimark

[57] ABSTRACT

A cylindrical wrapped bush has a joint extending over the entire width of the wrapped bush and serves to slidably or rotatably support a shaft on the inner peripheral surface of the wrapped bush. The joint is extended slantwise or stepwise relative to a generatrix on the outer peripheral surface of the wrapped bush at an angle which is more than 0 degree, but smaller than 85 degrees.

2 Claims, 3 Drawing Sheets

FIG. IA
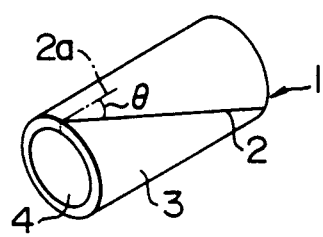
FIG. IB
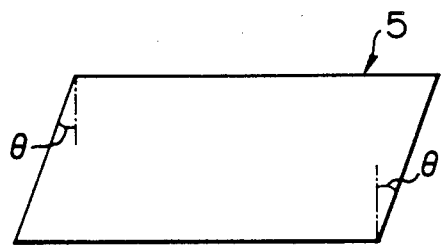
FIG. IC
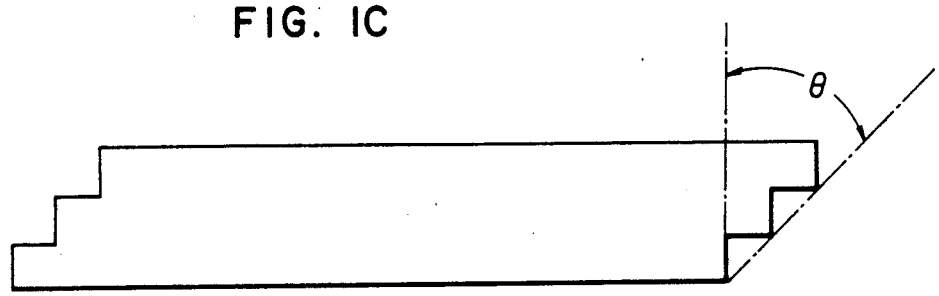

WRAPPED BUSH

This application is a continuation of application Ser. No. 715,480, filed Mar. 25, 1985, abandoned.

BACKGROUND OF THE INVENTION

This invention relates to improvements in a wrapped bush, and more particularly, to a wrapped bush of which joint is extended slantwise or stepwise relative to a generatrix of the outer periphery of the wrapped bush.

A conventional wrapped bush is formed by rolling up a rectangular plate into a cylindrical configuration such that its joint corresponds with a generatrix of the outer peripheral surface. This kind of wrapped bush involves the following disadvantages. First, a large power is required for rolling up a rectangular plate into a cylindrical configuration, which results in the degree of adhesion being poor and it being difficult to maintain the out of roundness. Secondly, working becomes more difficult as the ratio of the wall thickness of the wrapped bush to the diameter thereof increases. Thirdly, working becomes more difficult as the width of the bush increases in relation to the diameter thereof. Fourthly, there is the possibility of portions on both sides of a joint of the wrapped bush shifting along the joint in the opposite directions to each other during services. Fifthly, there is the possibility of a lubrication film breaking to reduce the load bearing ability.

SUMMARY OF THE INVENTION

It is an object of the invention to eliminate the above-described disadvantages of the prior wrapped bush by forming an oil groove or a relief area particularly along a joint on the wrapped bush.

It is another object of the invention to provide a wrapped bush, of which joint is extended slantwise or stepwise relative to a generatrix of the cylindrical outer peripheral surface of the wrapped bush to facilitate working and to enable positively and closely putting the edges of the wrapped bush together, and which can eliminate breakage of an oil film produced due to discontinuity of the joint and is free from distortion in the radial and axial directions to ensure out of roundness.

It is a further object of the invention to provide a wrapped bush which comprises a joint extended slantwise or stepwise relative to a generatrix of its cylindrical outer peripheral surface and an oil groove or a relief area extended along the joint or the ridgeline of the joint, said oil groove or relief area being inclined relative to a generatrix of the cylindrical outer peripheral surface to enable avoiding any oil breakage due to discontinuity of the oil groove or relief area, and which is easy working to enable positively putting the edges of the wrapped bush together and is free from distortion in the radial and axial directions to ensure out of roundness.

The above and other objects, features and advantages of the present invention will become clear from the following description of the preferred embodiments thereof, taken in conjunction with the accompanying drawings.

DESCRIPTION OF THE DRAWINGS

FIG. 1A is a perspective view of a wrapped bush according to a first embodiment of the invention;

FIG. 1B is a plan view of a parallelogramatic plate serving as a material for the wrapped bush shown in FIG. 1A;

FIG. 1C is a plan view of a modified form of the first embodiment;

DESCRIPTION OF THE PREFERRED EMBODIMENTS

Figure 2A:
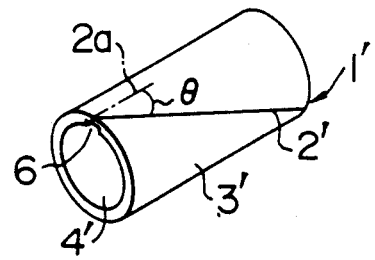
FIG. 2A is a perspective view of a wrapped bush according to a second embodiment of the invention.

Referring to FIGS. 1A and 1B, there is shown a wrapped bush 1 according to a first embodiment of the invention. A parallelogramatic plate 5 has such a configuration as to have an angle of $\theta$ formed between a joint 2 of the wrapped bush 1 and a generatrix 2a on the outer peripheral surface 3, and may be a single material or a composite material. In the case of a single material, a casting or a sintered body made of a material such as a known bearing alloy, or a rolled body thereof is used. In the case of a composite material, a bimetal or trimetal is used which is formed by coating a base metal (rigid body) of a known steel, a cast iron or the like with non-ferrous bearing metals. When such composite material is used, the plate 5 is rolled up so that the bearing metal presents itself on the inner peripheral surface 4 or outer peripheral surface 5 depending upon the usage. In the first embodiment, the parallelogramatic plate 5 having an angle of $\theta = 50°$ is rolled up to form the wrapped bush 1 with a diagonally disposed (straight type) butt-joint 2. As compared with the rolling up of a rectangular plate in the prior art, rolling up of a parallelogramatic plate in this way requires less power and enables positively and closely putting the edges of the bush together to be free from distortion in the radial and axial directions, thereby ensuring out roundness. Therefore, a predetermined clearance between the resulting wrapped bush 1 and an associated rotating shaft can be ensured and a good lubricating effect is attained without any breakage of a lubrication film.

Figure 2B:
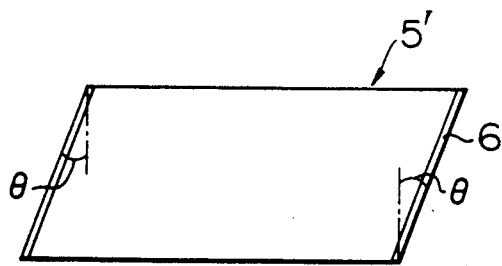
FIG. 2B is a plan view of a parallelogramatic plate serving as a material for the wrapped bush shown in FIG. 2A.
Figure 2C:
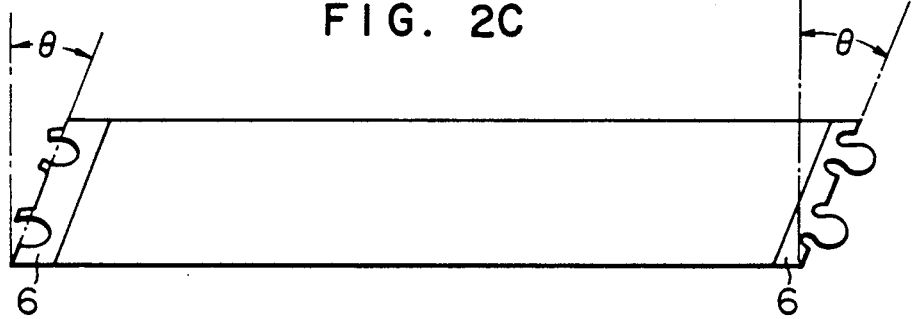
FIGS. 2C to 2H show in plan modified forms of the second embodiment.
Figure 2D:
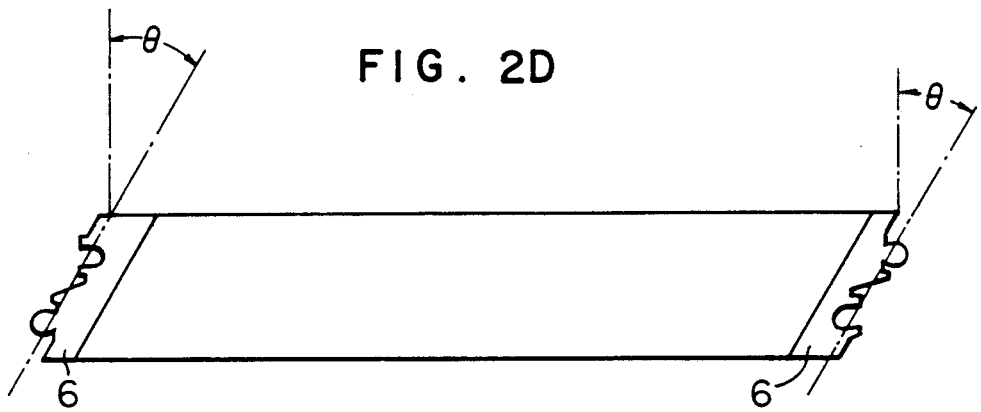
Figure 2E:
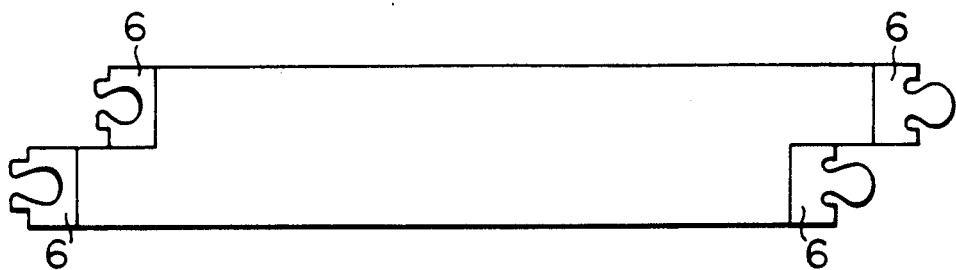
Figure 2F:
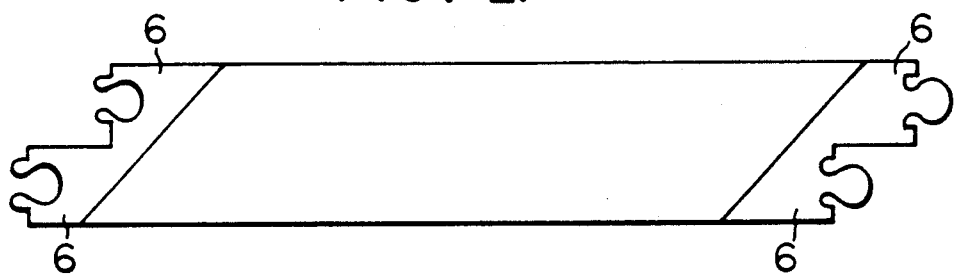
Figure 2G:
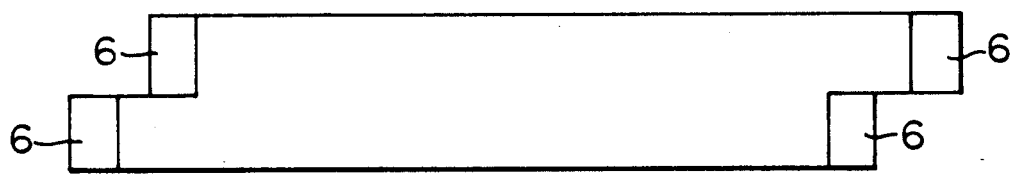
Figure 2H:
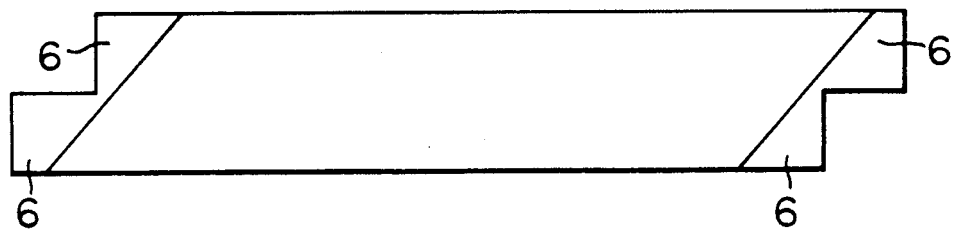

Referring to FIGS. 2A and 2B, there is shown a wrapped bush 1' according to the second embodiment of the invention. This wrapped bush 1' is different from the first embodiment, that is, the wrapped bush 1, only in that an oil groove or relief area 6 is formed along the joint on the inner peripheral surface 4'. As this wrapped bush 1' has the oil groove or relief area 6 extending along the joint 2', the influence of the joint 2' on the lubrication film as well as the influence of breakage of an oil film can be reduced to improve the lubrication effect. The oil groove or relief area 6 shown in FIG. 2A has a U-shaped cross section, but the cross section of the oil groove or relief area may be arcuate, V-shaped, trapezoidal or square. The joint may be in the form of butt joint, clinch joint (single or combined) or weld joint.

The above described angle $\theta$ of the parallelogramatic plates 5, 5', which serve as the materials for the wrapped bushes in the first and second embodiments, is 50 degrees, but experiments have proved that the angle may be more than 0°, but less than 85°. If the angle $\theta$ were 85 degrees or more, the slantwise joint resulted from roll forming would be incomplete.

FIG. 1C is a plan view of a flat plate which is used for a modified form of the first embodiment shown in FIGS. 1A and 1B.

FIGS. 2C to 2H are plan views of flat plates which are used for modified forms of the second embodiment shown in FIGS. 2A and 2B. It has been confirmed that the modified forms shown in FIGS. 2C to 2H are substantially equivalent to the second embodiment of FIGS. 2A and 2B in effects.

In the above modified forms shown in FIGS. 1C and 2C to 2H, the angle $\theta$ is 20°, 30° and 40°, respectively, but may be within the range of 0° to 85°. Here, it is to be noted that the modified forms of FIGS. 2C and 2D in which any oil groove or relief area is not provided are included in the present invention.

As described above, according to the invention, there is provided a wrapped bush which is easy in working to enable positively and closely putting the edges of a joint together, and is free from distortion in the radial and axial directions to ensure out of roundness, and which can eliminate breakage of an oil film produced due to discontinuity of the joint.

Modifications, changes, and improvements to the preferred forms of the invention herein disclosed, described and illustrated may occur to those skilled in the art who come to understand the principles thereof. Accordingly, the scope of the invention should not be limited to the particular embodiments set forth herein, but rather should be limited by the appended claims.

What is claimed is:

1. A cylindrical wrapped bearing bush wherein opposed edges of the wrapped bush are connected to form a joint;
    said joint extending over the entire width of the bush on a step-wise, slanted manner with respect to a generatrix on the outer peripheral surface of the bush;
    wherein each of the opposed edges has a number of right-angled steps which are disposed in a slanted manner with respect to the generatrix.

2. A cylindrical wrapped bearing bush wherein opposed edges of the wrapped bush are connected to form a joint;
    said joint extending over the entire width of the bush in a step-wise, slanted manner with respect to a generatrix on the outer peripheral surface of the bush;
    wherein each of the opposed edges is formed with a number of edge portions, the edge portions of one edge interconnecting with the edge portions on the outer edge;
    the opposed edge portions including on each edge, at least one male and/or female edge portion which interconnects with a corresponding female or male edge portion on the other edge;
    the edge portions of each opposed edge being disposed along that edge in a slanted manner with respect to the generatrix.

* * * * *